(12) United States Patent  
Crocker et al.

(10) Patent No.: US 8,412,732 B2  
(45) Date of Patent: Apr. 2, 2013

(54) AUTOMATICALLY GENERATING A SET OF EVENT PROCESSING RULES FOR USE IN A COMPLEX EVENT PROCESSING SYSTEM

(75) Inventors: Peter T. Crocker, Winchester (GB); Doina L. Klinger, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/193,547

(22) Filed: Jul. 28, 2011

(65) Prior Publication Data

US 2012/0124082 A1    May 17, 2012

(30) Foreign Application Priority Data

Nov. 16, 2010  (EP) .................................... 10191392

(51) Int. Cl.  
*G06F 17/30* (2006.01)

(52) U.S. Cl. .................. 707/769; 705/35; 707/E17.014
(58) Field of Classification Search .................. 707/769
See application file for complete search history.

(56) References Cited

U.S. PATENT DOCUMENTS

| 2003/0126181 A1* | 7/2003 | Young ........................... 709/100 |
| 2004/0002972 A1* | 1/2004 | Pather et al. ...................... 707/6 |
| 2009/0089352 A1* | 4/2009 | Davis et al. ................... 709/201 |
| 2011/0202496 A1* | 8/2011 | Klinger et al. .................. 706/60 |

* cited by examiner

*Primary Examiner* — Shyue Jiunn Hwa  
(74) *Attorney, Agent, or Firm* — Marcia L. Doubet (57) ABSTRACT

Automatically generating a set of event processing rules for use in a complex event processing (CEP) system and guiding a user through subsequent augmentation of such automatically-generated rules.

17 Claims, 8 Drawing Sheets

AUTOMATICALLY GENERATING A SET OF EVENT PROCESSING RULES FOR USE IN A COMPLEX EVENT PROCESSING SYSTEM

BACKGROUND OF THE INVENTION

The present invention relates to automatically generating a set of event processing rules for use in a complex event processing (CEP) system.

Complex event processing (CEP) application programs are arranged to perform event-driven processes. In other words, CEP application programs are arranged to detect a predetermined set of events and to perform a set of one or more actions in response to such detection. Typically, events may be responded to and actions may be performed in accordance with predetermined time-based criteria. For example, responses to events or the performance of actions may be subject to predetermined time delays or may be specified for response or performance at a specified time. Generally, CEP application programs are used to analyse complex patterns of events and perform a predetermined set of actions in response. The sets of events detected and the associated actions are commonly defined in a set of rules, which may be referred to as CEP rules. Sets of CEP rules are also referred to as interaction sets (ISs) and the individual rules referred to as interaction blocks (IBs). CEP application programs have many applications such as monitoring of biological, manufacturing, medical, aerospace, automotive, or business systems. When CEP application programs are applied to business systems, they may be referred to as business event processing (BEP) application programs.

In CEP systems, a technical user, that is a user experienced in the information technology (IT) aspects of the CEP system, will normally define possible events that might be received by the system. The IT user will also define intermediate structures and create mappings between the events and intermediate structures. Intermediate structures define the data that business logic specified in the CEP rules is permitted to operate on. The business logic is commonly provided by a less technical user, that is, a user experienced in the domain of application of the particular CEP system. Thus, once the IT user has defined the mappings, the non-technical user can create CEP rules embodying the necessary logic to process events when they are received by the system. However, in even a relatively simple CEP system, the non-technical user attempting to define CEP rules is likely to be presented with a large number of choices of available functions or fields, of which only a few may be required or relevant.

BRIEF SUMMARY

According to a first aspect, the invention provides a method for automatically generating a set of one or more event processing rules for use in a complex event processing (CEP) system, the method comprising: selecting a data model comprising data representing one or more events, intermediate objects, and actions, and data defining data flows between the events, intermediate objects, and actions; searching the data model to identify events linked by a respective data flow to a set of one or more actions; and automatically generating an event processing rule for each identified event, each event processing rule defining the actions as responses to the corresponding set of events. In other aspects, the invention may be provided (by way of example) as an apparatus or as a computer program stored on a computer readable medium and loadable into internal memory of a computer.

BRIEF DESCRIPTION OF THE SEVERAL VIEWS OF THE DRAWINGS

Embodiments of the invention will now be described, by way of example only, with reference to the accompanying drawings in which.

DETAILED DESCRIPTION

Figure 1:
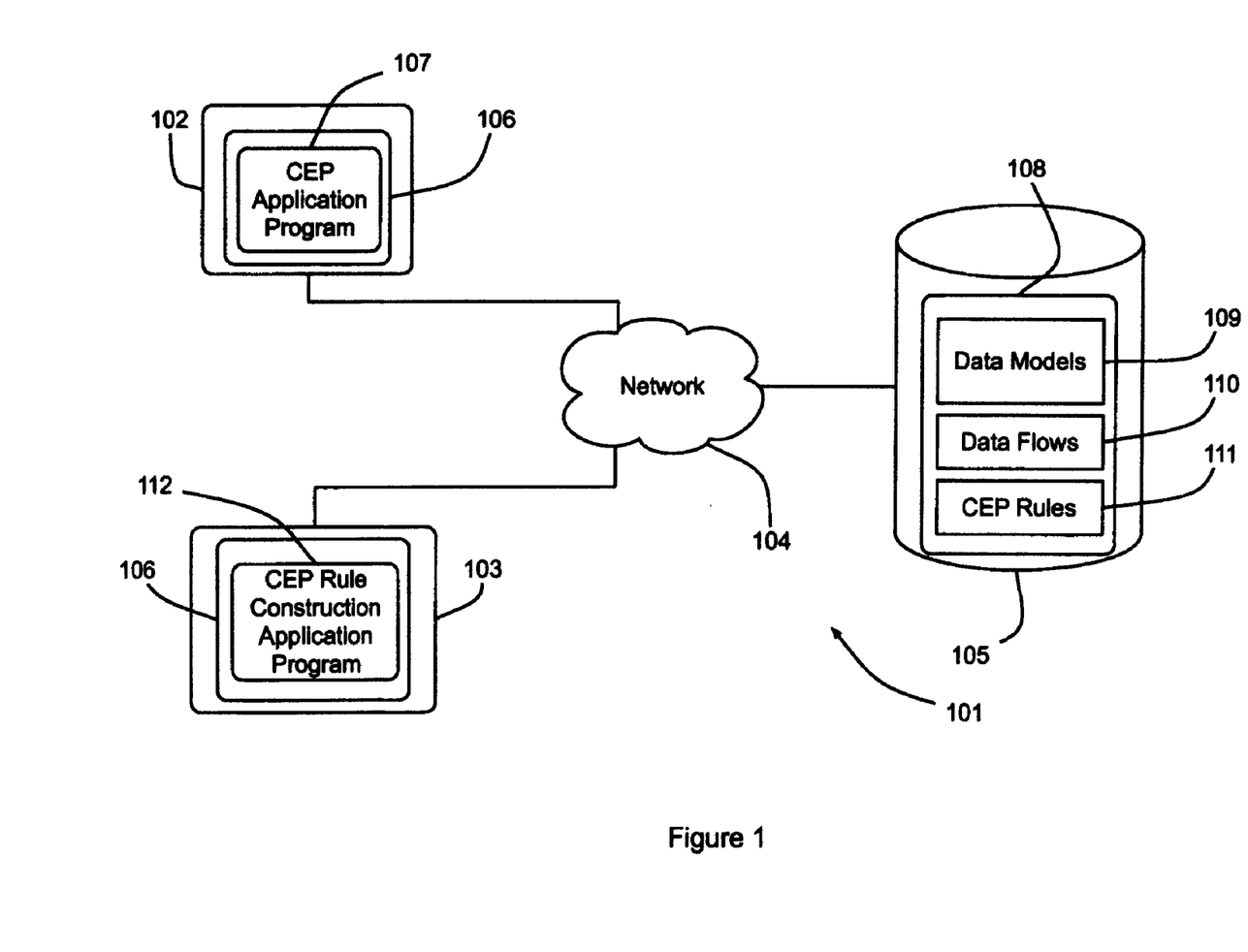
FIG. 1 is a schematic illustration of a computer system arranged to provide, in accordance with an embodiment of the present invention, a complex event processing (CEP) system.

With reference to FIG. 1, a computer system 101 comprises first and second computers 102, 103 connected via a network 104 to a storage device 105. The first and second computers are each provided with an operating system 106 that provides a platform for one or more application programs. In the present embodiment, the first computer 102 is arranged to run a complex event processing (CEP) application program 107. The storage device 105 comprises a database 108 arranged to store one or more CEP data models 109, data flow definitions 110, and sets of CEP rules 111.

A data model 109 comprises a set of logical constructs, that is, data structures arranged to represent events and actions for processing by the CEP application program 107. The data model also comprises intermediate data structures, referred to herein as intermediate objects (IOs), arranged to map data between the event and action data structures where appropriate. Thus the intermediate objects enable data from sources such as events, databases, or other IOs to be used to populate the fields of one or more actions. Such data is available for processing by the CEP logic, in the form of the CEP rules 111, to determine whether or not to trigger the performance of the associated actions. In other words, the CEP application program 107 is arranged to respond to received sets of one or more events with appropriate actions, in accordance with the relevant rules 111.

The second computer 103 is arranged to run a CEP rule construction application program 112 arranged to enable the construction of CEP rules 111 from CEP logical constructs representing the events, actions, relations, filters, or conditions in the CEP system. An event is the input data or message that can trigger one or more CEP rules 111. Any given CEP rule 111 may be triggered by a group of two or more such events. CEP rules 111 may be also be triggered by predetermined time-based criteria or by the absence of a given event. Actions are the output data or message of a given CEP rule 111 as a result of its trigger. A given CEP rule 111, when fired, may result in one or more actions being output. Filters and conditions are used to specify conditions on a given event pattern detected or on the actions that may be generated as a result. Relations used define a required relationship between the events that are being detected. In other words, the relation defines a rule-wide condition or filter for the relevant set of events.

Figure 2:
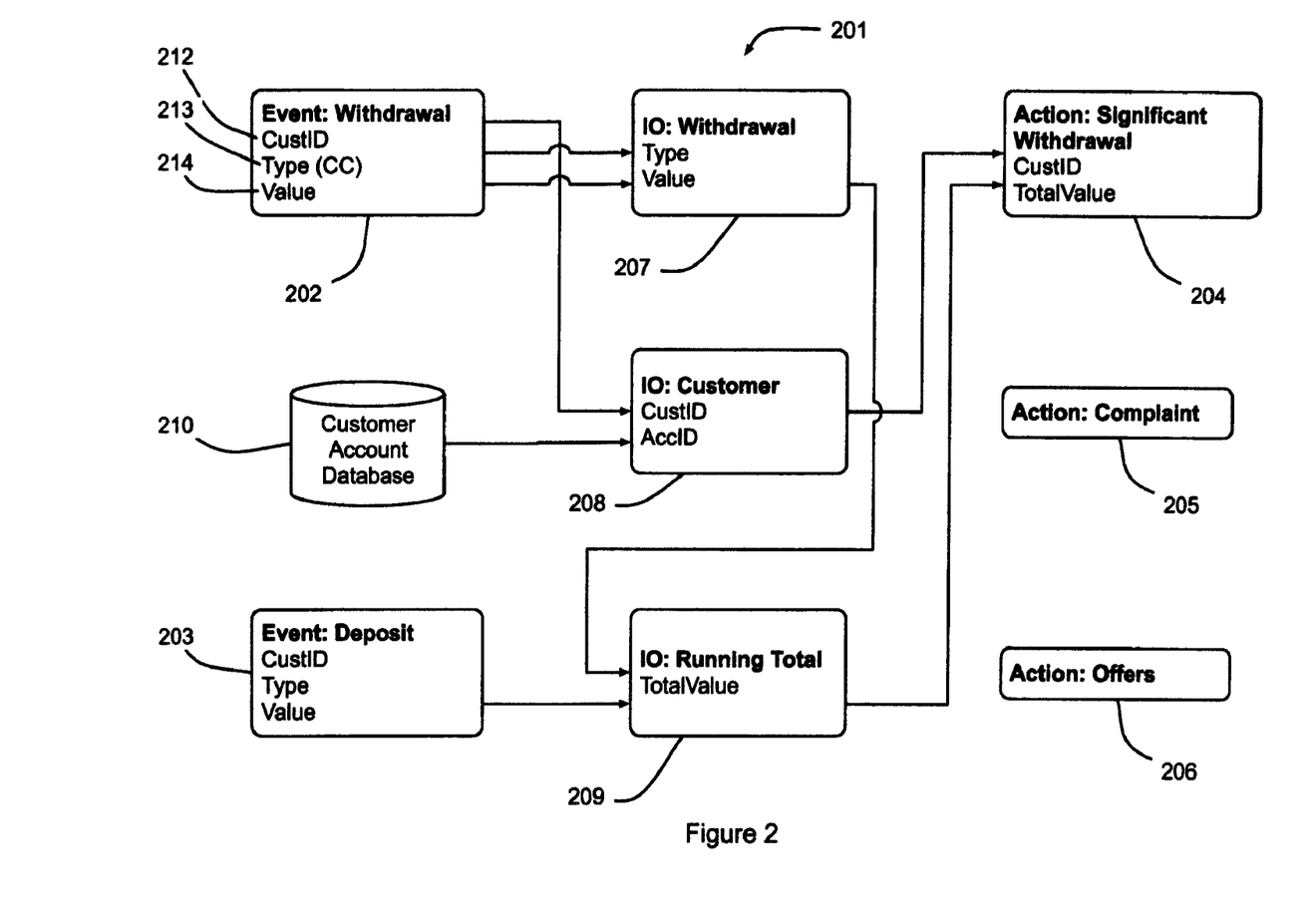
FIG. 2 is a schematic view of an example data set and corresponding data flow in the CEP system of FIG. 1.

With reference to FIG. 2, an example CEP data model 201 for a banking system models two events in the form of a "Withdrawal" event logical construct 202 and a "Deposit" event logical construct 203. The data model 201 further models three actions in the form of a "Significant Withdrawal" action logical construct 204, a "Complaint" action logical construct 205, and an "Offers" action logical construct 206. The data model 201 also comprises three intermediate objects (IOs) in the form of a "Withdrawal" IO 207, a "Customer" IO 208, and a "Running Total" IO 209. The model 201 also identifies a data source 210 in the form of a customer account database from which defined data is retrieved. In FIG. 2, the data flow for the model 201 is indicated by way of named fields in the events, IOs, and actions directionally interconnected by arrows. For example, the data from the "CustID" field 212 of the "Withdrawal" event 202 is fed into the corresponding field of the "Customer" IO 208 and the "Type" and "Value" fields 213, 214 are fed into the corresponding fields of the "Withdrawal" IO 207.

Commonly in CEP systems, the data model 201 and corresponding data flow is created by a technical user of the CEP system on behalf of a non-technical user. In other words, the data model and flow are created by a CEP system engineer on behalf of a user having CEP system domain-centric skills. For example, if the CEP system is a business system, the technical user is likely to be an information technology engineer versed in the technical elements of the CEP system while the non-technical user may be a business analyst. Typically, once the data model and flow, such as that shown in FIG. 2, have been created by the technical user, they are passed to the non-technical user.

In the present embodiment, the CEP rule construction application program 112 is arranged to automatically generate basic CEP rules from a given data model 109 and then to guide the non-technical user through augmentation of rules with additional events, conditions/filters, or time delays as required. Thus in response to the input of a new data model, the CEP rule construction application program 112 is arranged to identify each event in the data model and to create a new rule set, also referred to as an interaction set, for each such identified event. The CEP rule construction application program 112 is then arranged to search the data flow to identify each interaction present in the data set in the form of an event linked by respective data flow to one or more actions.

For each such identified interaction, the CEP rule construction application program 112 automatically creates a basic CEP rule 111 having the following general form:

```
Rule <name>:
    In response to <event1>
    then <action1>
    then <action2>
    ...
    then <actionN>
```

The CEP rule construction application program 112 is further arranged to identify instances in the data flow where two or more events contribute to the same intermediate object. For each such occurrence, a context relationship is automatically added to the relevant interaction set as described in further detail below.

Thus, from the new data model 201 of FIG. 2, the CEP rule construction application program 112 creates a first interaction set for the "Withdrawal" event 202 and a rule, in the form of an interaction block, based on the data flow between the "Withdrawal" event 202 and the "Significant Withdrawal" action 204. The rule is as follows:

Rule 1:
    In response to Withdrawal
    then Significant Withdrawal

Furthermore, since the "Withdrawal" event 202 and the "Deposit" event 203 both contribute to the "Running Total" IO 209, a relationship is also identified between the events 202, 203 in the form of the common IO field "CustID". In the present embodiment, this identified relationship is presented to the user for confirmation.

Figure 3:
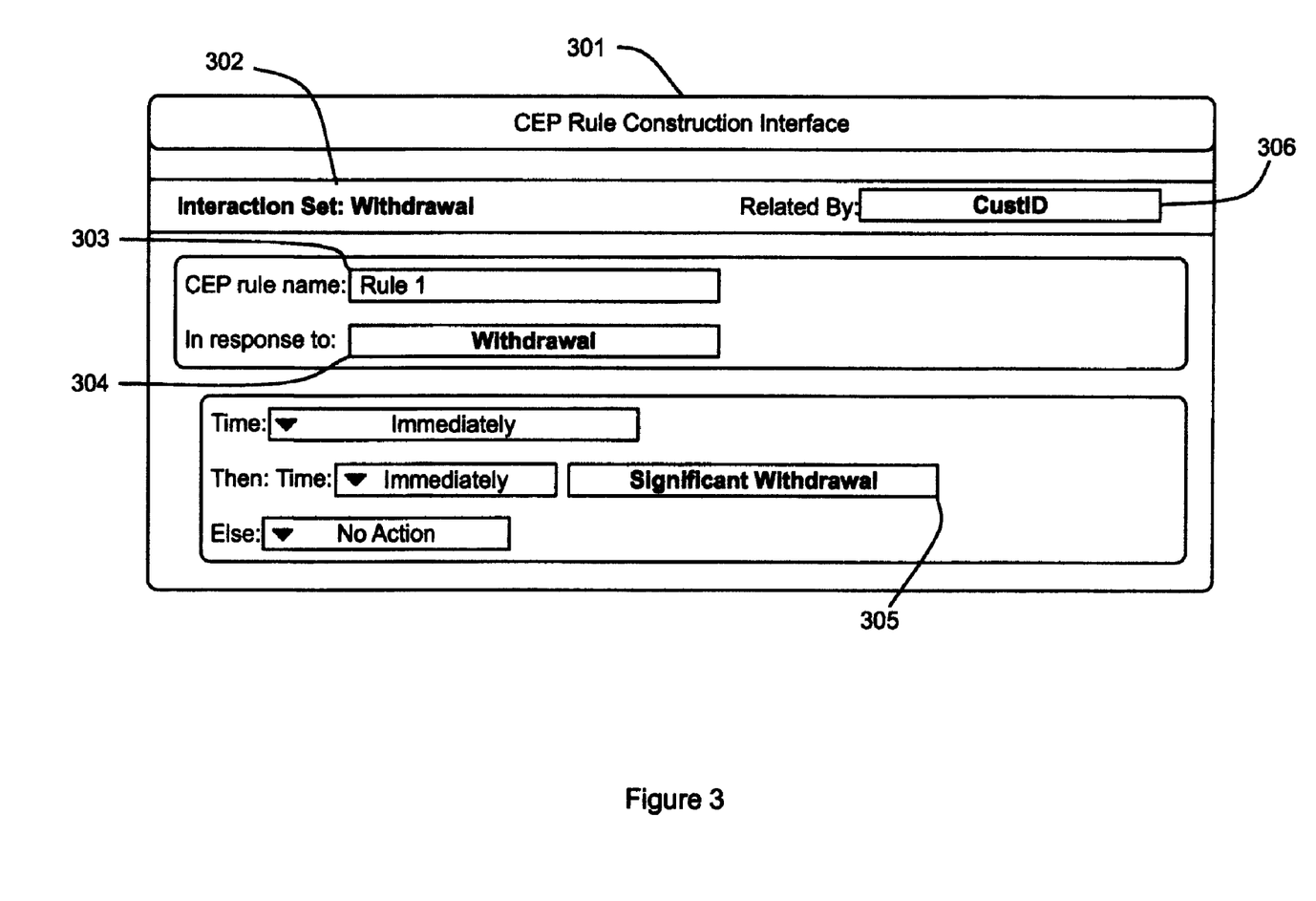
FIG. 3 is an example of a rule definition interface showing an automatically-generated rule in the CEP system of FIG. 1.

In the present embodiment, with reference to FIG. 3, a rule creation interface 301 is provided for presenting the newly created interaction set 302 to the user. The interface 301 identifies the automatically-generated rule with a default rule name "Rule 1" 303 along with the "Withdrawal" event 304 and the resulting "Significant Withdrawal" action 305. The "CustID" relation 306 is also identified, which links the event 304 to associated events in the data set. The interface 301 is arranged, in a known manner, to enforce the syntax of CEP rules 111, that is, the interface 301 comprises knowledge of what constitutes a well-formed or correct CEP rule 111 in order to properly generate such rules.

The interface 301, as shown in FIG. 3, provides the facility for the user to augment the automatically-generated basic CEP rule with the desired business logic by adding further events, time delays to events or actions, or conditions to actions. In the present embodiment, syntactically correct conditions can take any suitable combination of events, timing criteria, logical operators, or constants. For example, a filter may evaluate as true or false in dependence on whether or not a specified set of events have occurred in a particular sequence, within a predetermined relative time frame or within a specified period. As will be understood by those skilled in the art, each CEP logical element may comprise a single such element or a sequence of two or more such elements and logical operators, such as logical OR, AND, or NOT, so as to form a composite logical element.

The CEP rule construction application program 112 is arranged to guide the user through at least the initial steps of augmenting the automatically-generated basic CEP rule with the desired business logic by adding further events, time delays to events or actions, or conditions to actions. In the present embodiment, the guiding of the user is performed via a set of natural language questions arranged to prompt simple responses from the user and thus simplify the otherwise complex task of adding the desired business logic via the interface 301.

In the present embodiment, the first part of the guidance process is arranged to determine from the user whether the given rule relates to a simple or complex event processing. In other words, can the action specified in the given rule be properly generated purely from the observation of the single event currently specified in the given rule. In the present embodiment, the user is prompted to answer the following question:

"Can the action be generated just by looking at the current event?"

If the user answers "yes", then the interaction set is a simple one that does not respond to more than one event. If, however, the user answers "no", then the user is asked to indicate the required event. The CEP rule construction application program 112 is then arranged to provide the user with a list of the IO fields that are available from the relevant data model and prompts the user with the question:

"Choose a field that relates the events."

In response to the user's selection, the selected event is added to the rule and the selected IO field added as a relation to the interaction set via the "Related by" field.

The second part of the guidance process is arranged to determine from the user whether or not any of the events or actions in the relevant rule should be subject to a time delay. In the present embodiment, the user is prompted to answer the following question:

"Should the processing of any events or actions be delayed?"

If no time delays are required, then each event and action is set to be processed immediately, as shown in FIG. 3. If time delays are required, then for each event and action in turn, the user is prompted to answer the following question:

"Process this event/action later?"

For each event or action where a time delay is required, the user is provided with a time delay definition interface (not shown) and the resulting input is stored as the appropriate time delay for the given event or action in the relevant interaction block.

The third part of the guidance process is arranged to determine from the user whether or not any of the actions in the relevant rule should be conditional. In the present embodiment, the user is prompted to answer the following question for each event/action pairing:

"Is there any condition for generating Action1 from Event1?"

If no condition is required, then the relevant action will always be generated in response to the corresponding event, as shown in FIG. 3. If a condition is required, then a condition definition interface (not shown) is provided to the user. The condition definition interface is arranged to offer the user an option to select an existing condition or define a new condition. If the user opts to define a new condition, then the user is prompted to enter a name and a new empty condition is created. The condition definition interface is then arranged to guide the user through the specification of the new condition. For example, the user is guided through the selection of the required numerical, date, Boolean, or other event computations. The user is also guided through a composition mechanism for conditions in which a given condition or filter may use the result of another condition or filter. Conditions or filters may be combined in accordance with selected logical operators.

Figure 4:
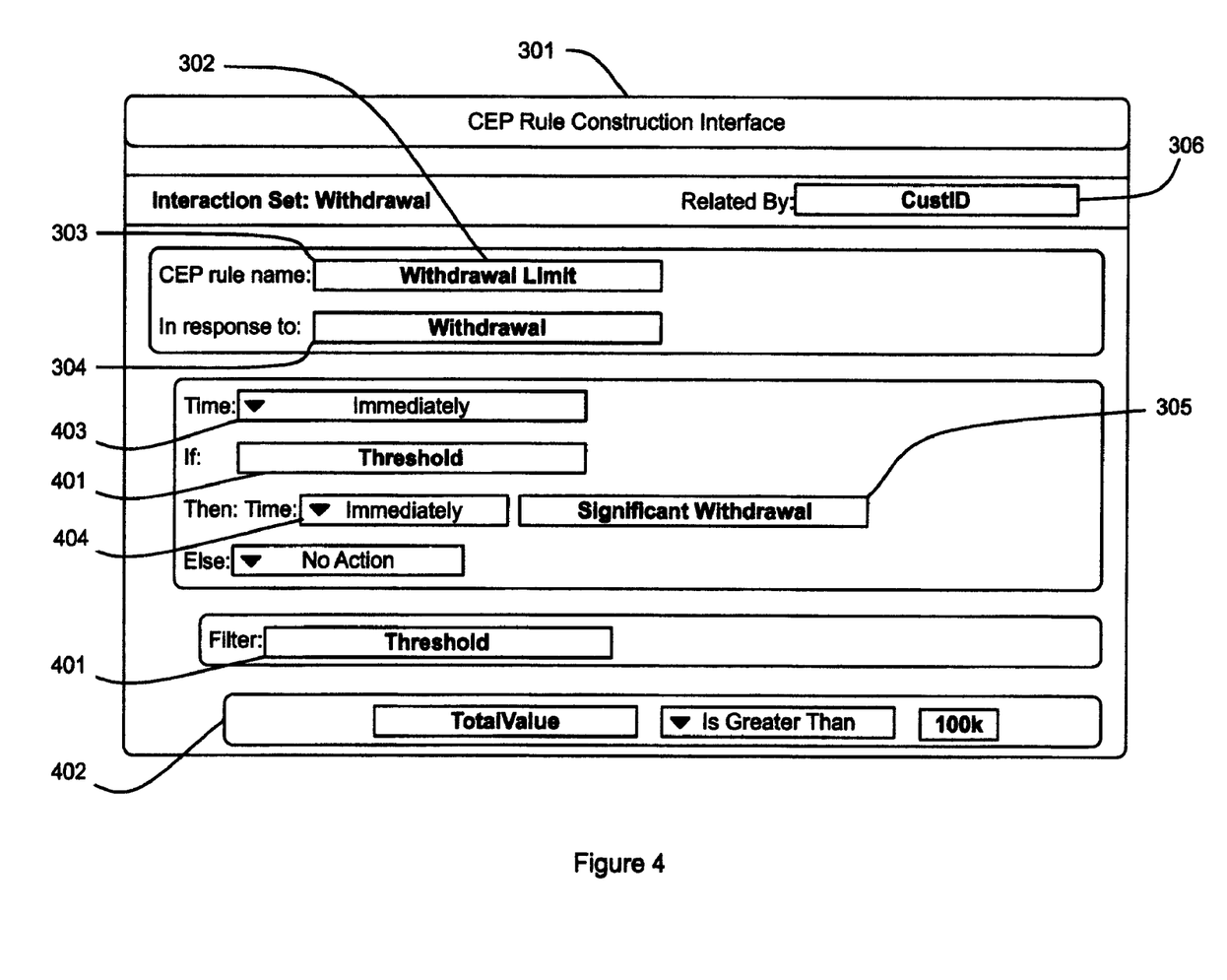
FIG. 4 is a further example of the interface of FIG. 3 showing the automatically-generated rule augmented with a condition.

With reference to FIG. 4, the user has added a condition "Threshold" 401 that only enables the "Significant Withdrawal" action 305 when the value of a variable "TotalValue" 402 exceeds the value of one hundred thousand. In other words, the "Significant Withdrawal" action 305 is now conditional on the newly-defined condition "Threshold" 401. Also, as shown in FIG. 4, the time delay fields 403, 404 are set so that both the condition "Threshold" 401 and the "Significant Withdrawal" action 305 are processed immediately in response to the detection of the "Withdrawal" event 304. As will be understood by those skilled in the art, the interface 301 enables the user to perform any further manual augmentation that is required.

Figure 5:
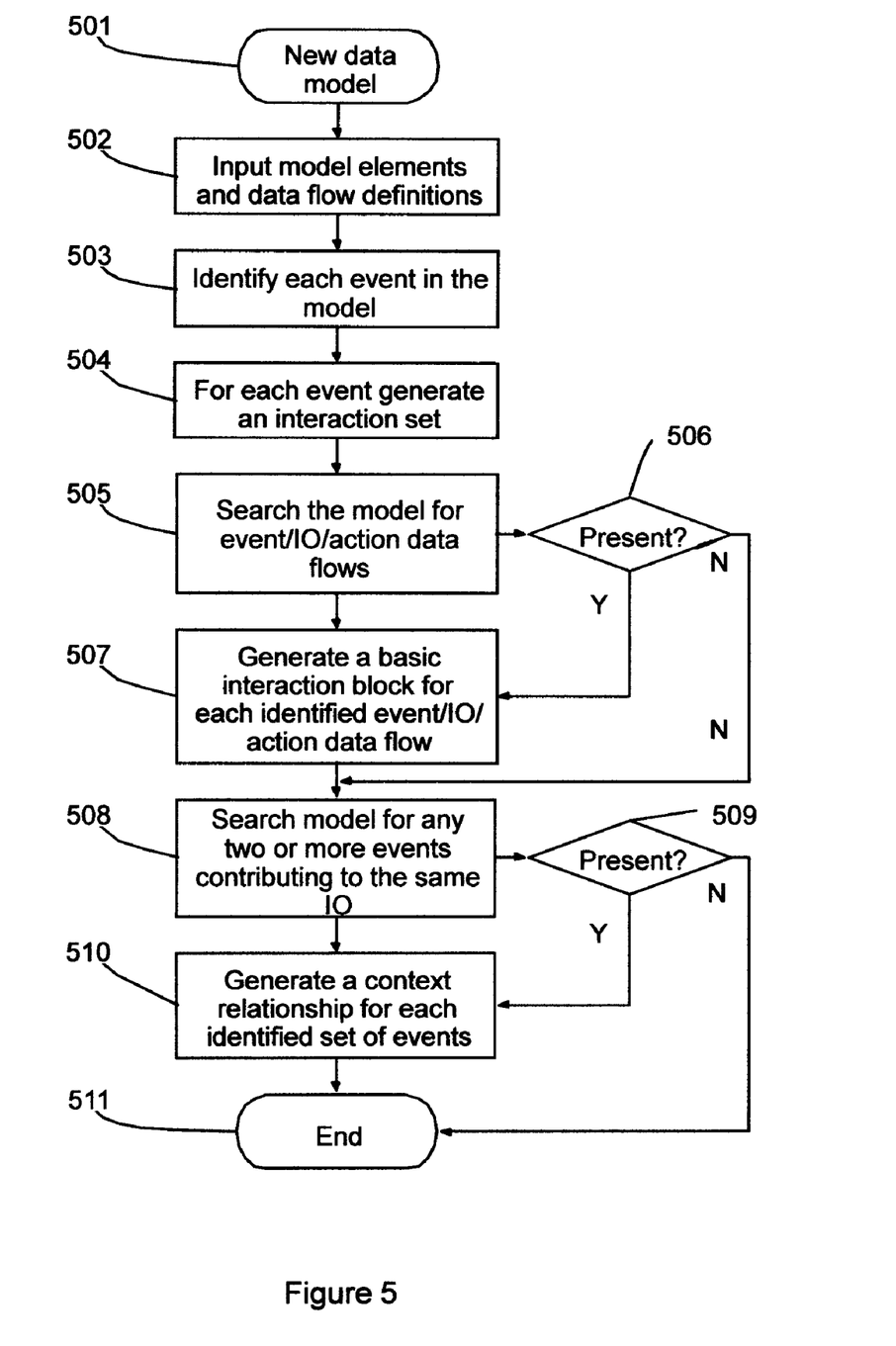
FIG. 5 is a flow chart illustrating, in accordance with an embodiment of the present invention, the processing performed by CEP system of FIG. 1 when automatically generating a CEP rule for a data set.

The processing performed by the CEP rule construction application program 112 when processing a new data model will now be described in further detail with reference to the flow chart of FIG. 5. Processing is initiated at step 501 in response to the input of a new data model and processing moves to step 502. At step 502, the data structures that represent the model elements and associated data flow are imported and processing moves to step 503. At step 503, each event in the model is identified and processing moves to step 504. At step 504, for each event identified in the previous step, a new interaction set is created and processing moves to step 505. At step 505, the model is searched to identify each event to intermediate object to action data flow and processing moves to step 506. At step 506, if any such data flows were identified in the previous step, then processing moves to step 507. At step 507, for each such identified data flow, a basic interaction block is generated in the relevant interaction set and processing then moves to step 508 where the model is searched for any two or more events that contribute to the same intermediate object and processing then moves to step 509. At step 509, if any sets of two or more such events are identified, then processing moves to step 510. At step 510, a context relationship is generated for each such identified set of events and the relevant interaction set updated accordingly. Processing then moves to step 511 and ends. If at step 506 the search is negative, then processing skips step 507 and moves directly to step 508 and proceeds as described above. If at step 509 the search is negative, then processing skips step 510 and moves directly to step 511 and ends.

Figure 6:
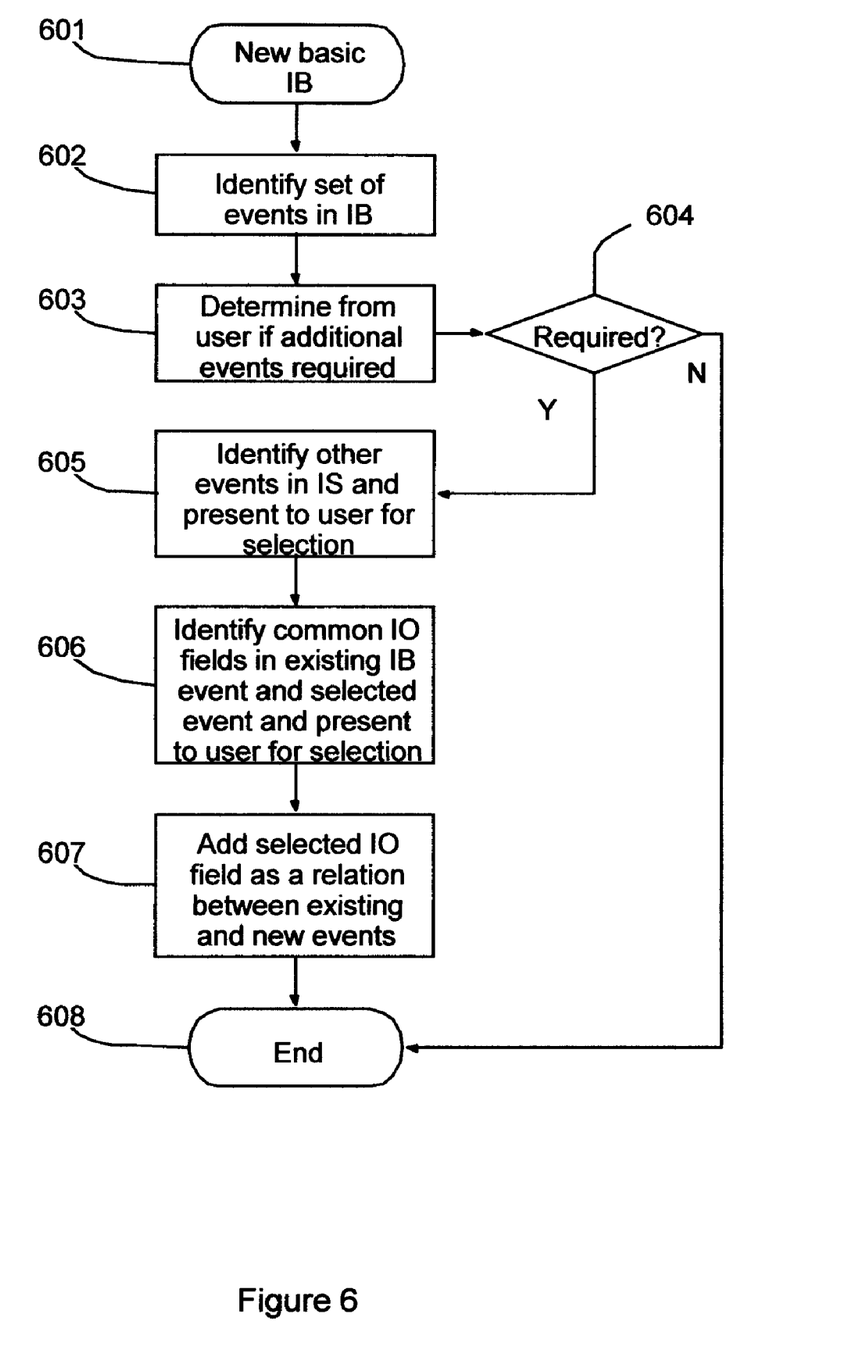
FIGS. 6, 7, and 8 are flow charts illustrating, in accordance with an embodiment of the present invention, further processing of automatically-generated CEP rules performed by CEP system of FIG. 1.

The processing performed by the CEP rule construction application program 112 when guiding a user through the augmentation of an interaction block will now be described in further detail with reference to the flow charts of FIGS. 6, 7, and 8. With reference to FIG. 6, processing is initiated at step 601 in response to the automatic creation of a new basic interaction block and processing moves to step 602. At step 602, the set of all events in the interaction block is identified and processing moves to step 603. At step 603, the user is questioned on whether or not any additional events are required for the given interaction block and processing then moves to step 604. At step 604, if further events are indicated as required, then processing moves to step 605. At step 605, all other events in the interaction set having common intermediate object fields with the existing event are identified and presented to the user for selection and processing moves to step 606. At step 606, in response to user selection of one or more additional events, the common intermediate object fields between the existing event and selected events are presented to the user for selection as a context relationship between the events of the given interaction set and processing moves to step 607. At step 607, the selected IO field is added to the relevant interaction set as a context relationship and processing moves to step 608 and ends. If at step 604 no additional events are required, then processing also moves to step 608 and ends.

Figure 7:
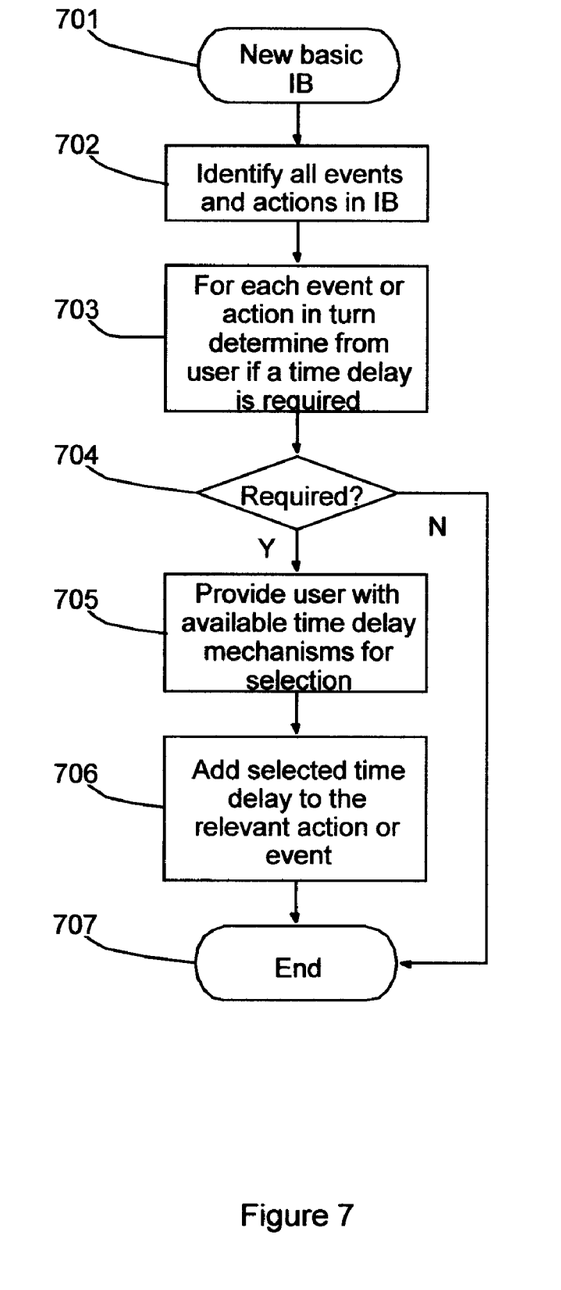

With reference to FIG. 7, processing is initiated at step 701 in response to the creation of a new basic interaction block and processing moves to step 702. At step 702, the set of all events and actions in the interaction block is identified and processing moves to step 703. At step 703, the user is questioned on which of the events or actions are required to be delayed and processing then moves to step 704. At step 704, if any delays are required, then processing moves to step 705. At step 705, the user is provided with a time delay specification interface for defining the time delays for each selected event or action and processing moves to step 706. At step 706, in response to the user input to the time delay specification interface, the appropriate time delays are added to the relevant events and actions. Processing then moves to step 707 and ends. If at step 704 no time delays are required, then processing also moves to step 707 and ends.

Figure 8:
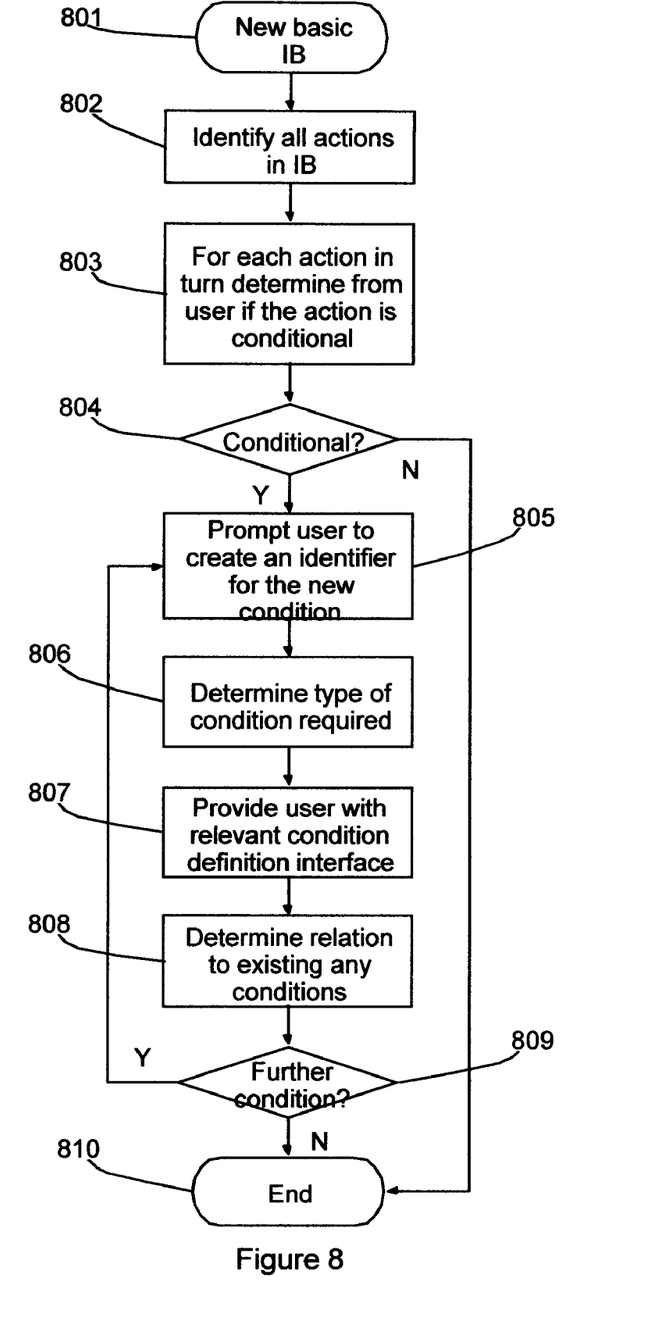

With reference to FIG. 8, processing is initiated at step 801 in response to the creation of a new basic interaction block and processing moves to step 802. At step 802, the set of all actions in the interaction block is identified and processing moves to step 803. At step 803, the user is questioned on whether any conditions are required for one or more of the actions and processing then moves to step 804. At step 804, if any conditions are required, then processing moves to step 805. At step 805, the user is prompted to define an identifier for the condition and in response processing moves to step 806. At step 806, the user is prompted to select one of a predetermined type of condition and in response processing moves to step 807. At step 807, the user is provided with a condition specification interface for defining the selected type of condition for a given action and processing moves to step 808. At step 808, in response to the user input to the condition specification interface, the appropriate conditions are added to the relevant action and processing moves to step 809. At step 809, if further conditions are required, then processing returns to step 805 and processing continues as described above to create a composite condition. If at step 809 no further conditions are required, then processing also moves to step 810 and ends. Similarly, if at step 804 no conditions are required, then processing also moves to step 810 and ends.

In another embodiment, the CEP rule construction application program 112 is arranged to identify flow-scoped variables, also referred to as context-scoped intermediate objects (CSIO), when analyzing a new data model and data flow. CSIOs are defined by the technical user during the definition of the data model. A CSIO is a type of variable typically used to compute values within a given context. For example, an event "WithdrawCash" has three fields "Amount", "CustomerID", and "BankID, and a flow-scoped variable named "Total Withdrawals" used for calculating the total withdrawals for a specific customer. Given that withdrawal events are received for two customers with CustomerIDs of 123 and 456, there will thus be two running totals and two instances of the "Total Withdrawals" variable corresponding to the two customers. By definition, such variables need to be computed within a context. So a generated rule comprising such a variable would need to have an appropriate context relationship defined. It is generally not possible to automatically determine which field the user would want to use as such a context. In the present example, the context relationship could be either the BankID, for computations across events related to all customers of a specific bank, or CustomerID, for computations for a specific customer. But since such a context relationship is necessary, in the present embodiment, the user is prompted to select one of the fields to form the context relationship for the relevant interaction set.

In a further embodiment, the CEP rule construction application program is arranged, when guiding a user through the augmentation of an interaction block, to utilise the user's responses to the questions to dynamically modify the content of the interface presented to the user. For example, when defining a condition, the user may be asked for the type of the desired condition. In other words, the user is asked if the condition should be numerical, date related, or Boolean. If the user selects one type, then the interface is arranged to dynamically remove any options related to the non-selected types from the interface. Thus the user is more clearly guided through the composition interface. In another example, if the user indicates that time criteria are not relevant, the interface is arranged to automatically hide all references to time in the user interface. As will be understood by those skilled in the art, such guiding and dynamic interface techniques may be applied to a suitable part of the interaction between the user and the CEP rule construction application program when augmenting one or more automatically-generated CEP rules.

As understood by those skilled in the art, an interaction block is triggered by a single event even when the inspection of further events is required to evaluate the conditions determining whether to generate an action. However, the programming model described herein is flexible in how blocks can be grouped in sets. For example, each block may be grouped in its own set, providing the option to individually name the block, since sets are named assets and blocks are not. Alternatively, all blocks triggered by one event may be grouped in one set. Other arrangements may also be provided where appropriate.

As will be understood by those skilled in the art, the particular constructs or elements that comprise a rule are dependent on the CEP system for which embodiments of the invention are provided. The syntax of the rules may vary from the examples described above, as may the types or number of types of elements or their function or structure. Interaction sets or blocks may specify the source systems of events and the target systems for the generated action. Such sources and targets may be referred to as touch points. As will be understood by those skilled in the art, the condition specification interface described above may be arranged to enable the user to select a predefined condition for application to a given interaction block either alone or in combination with one or more user-defined or other predefined conditions.

An example of a CEP system in the form of a BEP system is the IBM® WebSphere® Business Events software system provided by the IBM Corporation. (IBM and WebSphere are registered trademarks of International Business Machines Corporation in the United States and/or other countries.)

It will be understood by those skilled in the art that the apparatus that embodies a part or all of the present invention may be a general purpose device having software arranged to provide a part or all of an embodiment of the invention. The device could be a single device or a group of devices and the software could be a single program or a set of programs. Furthermore, any or all of the software used to implement the invention can be communicated via any suitable transmission or storage means so that the software can be loaded onto one or more devices.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details of the representative apparatus and method, and illustrative examples shown and described. Accordingly, departures may be made from such details without departure from the spirit or scope of applicant's general inventive concept.

The invention claimed is:

1. A method for automatically generating a set of one or more event processing rules for use in a complex event processing system, the method comprising:
   selecting a data model comprising data structures representing one or more events, intermediate objects, and actions, wherein each of the intermediate objects represents data exchanged on a data flow that occurs between at least one of the events and at least one of the actions;
   searching the data model to identify each of the one or more events represented therein;
   for each of the identified events, searching data flow definitions associated with the data model to identify each interaction of the identified event, each interaction comprising a link by a respective data flow originating from the identified event, through any one of the intermediate objects, to a set of one or more actions;

automatically generating an event processing rule for each identified interaction of each identified event, each event processing rule defining the one or more actions as responses to the identified event;

for each of the identified events, storing each automatically-generated event processing rule for the identified event in an interaction set created for the identified event, the interaction set usable for subsequently processing occurrences of the identified event;

determining each selected one of the intermediate objects for which the data flow through the intermediate object originates from two or more of the events;

in response to determining the each selected one, automatically defining a context relationship therefor; and updating a corresponding one of the automatically-generated rules in the interaction set, the corresponding one relating the two or more of the events, to include the automatically-defined context relationship.

2. The method according to claim 1, wherein the automatically-defined context relationship is defined by a common intermediate object field, the common intermediate object field being specified in the data flow through the selected intermediate object for each of the two or more events.

3. The method according claim 1, wherein automatically generating the event processing rule further comprises:
searching the data model to identify any context-scoped intermediate objects (CSIOs) represented therein, each of the any CSIOs corresponding to a variable used to compute values within a context;
for each of the any identified CSIOs, identifying a set of possible context relationships for the identified CSIO;
defining a context relationship for the rule in response to user selection from the set of possible context relationships; and
including the context relationship when storing the rule in the interaction set.

4. The method according to claim 1, further comprising:
determining from a user whether or not to add further events to one or more of the rules; and
responsive to the user indicating that at least one further event is needed for a particular rule, performing:
determining an already-present event for the particular rule;
determining, from the interaction of the already-present event for which the particular rule was generated, each of at least one field in the intermediate object corresponding to the link for the interaction;
for each additional event which is distinct from the already-present event and which is represented in any rule of the interaction set for the particular rule, identifying the intermediate object corresponding to the link for the interaction of the additional event for which the any rule was generated and each of at least one field in the determined intermediate object, each of the identified at least one field being a potential common field;
presenting for selection by the user only particular ones of the events from the selected data model, each of the particular ones having a potential common field that is identical to any of the at least one field determined for the already-present event in the particular rule; and adding each user-selected one of the presented events to the particular rule in response to user selection thereof.

5. The method according to claim 4, further comprising:
defining, for each user-selected event added to the particular rule, a context relationship for the particular rule, the context relationship comprising the field that is identical between the at least one field determined for the already-present event in the particular rule and the at least one potential common object identified for the added event.

6. The method according to claim 1, further comprising:
determining from a user whether or not to add one or more predetermined types of condition to one or more of the actions;
in response to user selection of one or more types of condition for a given action, presenting a condition specification interface to the user comprising only the selected types of condition; and
in response to user specification of one or more conditions for the given action, associating the specified condition with the given action in the rule.

7. The method according to claim 6, wherein the determining from the user is performed using natural language questions.

8. The method according to claim 1, further comprising:
determining from a user whether or not to add one or more time delays to one or more of the events or actions;
in response to user selection of one or more time delays for a given event or action, presenting a time delay specification interface to the user; and
in response to user specification of a time delay for the given event or action, associating the specified time delay with the given event or action in the rule.

9. Apparatus for automatically generating a set of one or more event processing rules for use in a complex event processing system, comprising:
a computer comprising a processor; and
instructions which are executable, using the processor, to perform functions comprising:
selecting a data model comprising data structures representing one or more events, intermediate objects, and actions, wherein each of the intermediate objects represents data exchanged on a data flow that occurs between at least one of the events and at least one of the actions;
searching the data model to identify each of the one or more events represented therein;
for each of the identified events, searching data flow definitions associated with the data model to identify each interaction of the identified event, each interaction comprising a link by a respective data flow originating from the identified event, through any one of the intermediate objects, to a set of one or more actions;
automatically generating an event processing rule for each identified interaction of each identified event, each event processing rule defining the actions as responses to the identified event;
for each of the identified events, storing each automatically-generated event processing rule for the identified event in an interaction set created for the identified event, the interaction set usable for subsequently processing occurrences of the identified event;
determining each selected one of the intermediate objects for which the data flow through the intermediate object originates from two or more of the events;
in response to determining the each selected one, automatically defining a context relationship therefor; and updating a corresponding one of the automatically-generated rules in the interaction set, the corresponding one relating the two or more of the events, to include the automatically-defined context relationship.

10. The apparatus according to claim 9, wherein the automatically-defined context relationship is defined by a common intermediate object field, the common intermediate object field being specified in the data flow through the selected intermediate object for each of the two or more events.

11. The apparatus according to claim 9, wherein the functions further comprise:
searching the data model to identify any context-scoped intermediate objects (CSIOs) represented therein, each of the any CSIOs corresponding to a variable used to compute values within a context;
for each of the any identified CSIOs, identifying a set of possible context relationships for the identified CSIO;
defining a context relationship for the rule in response to user selection from the set of possible context relationships; and
including the context relationship when storing the rule in the interaction set.

12. The apparatus according to claim 9, wherein the functions further comprise:
determining from a user whether or not to add further events to one or more of the rules; and
responsive to the user indicating that at least one further event is needed for a particular rule, performing:
determining an already-present event for the particular rule;
determining, from the interaction of the already-present event for which the particular rule was generated, each of at least one field in the intermediate object corresponding to the link for the interaction;
for each additional event which is distinct from the already-present event and which is represented in any rule of the interaction set for the particular rule, identifying the intermediate object corresponding to the link for the interaction of the additional event for which the any rule was generated and each of at least one field in the determined intermediate object, each of the identified at least one field being a potential common field;
presenting for selection by the user only particular ones of the events from the selected data model, each of the particular ones having a potential common field that is identical to any of the at least one field determined for the already-present event in the particular rule; and
adding each user-selected one of the presented events to the particular rule in response to user selection thereof.

13. The apparatus according to claim 12, wherein the functions further comprise:
defining, for each user-selected event added to the particular rule, a context relationship for the particular rule, the context relationship comprising the field that is identical between the at least one field determined for the already-present event in the particular rule and the at least one potential common object identified for the added event.

14. The apparatus according to claim 9, wherein the functions further comprise:
determining from a user whether or not to add one or more predetermined types of condition to one or more of the actions;
in response to user selection of one or more types of condition for a given action, presenting a condition specification interface to the user comprising only the selected types of condition; and
in response to user specification of one or more conditions for the given action, associating the specified condition with the given action in the rule.

15. The apparatus according to claim 14, wherein the determination from the user is performed using natural language questions.

16. The apparatus according to claim 9, wherein the functions further comprise:
determining from a user whether or not to add one or more time delays to one or more of the events or actions;
in response to user selection of one or more time delays for a given event or action, presenting a time delay specification interface to the user; and
in response to user specification of a time delay for the given event or action, associating the specified time delay with the given event or action in the rule.

17. A computer program stored on a non-transitory computer readable medium and loadable into an internal memory of a computer, comprising software code portions, when the program is run on the computer, for automatically generating a set of one or more event processing rules for use in a complex event processing system, the software code portions configured for:
selecting a data model comprising data structures representing one or more events, intermediate objects, and actions, wherein each of the intermediate objects represents data exchanged on a data flow that occurs between at least one of the events and at least one of the actions;
searching the data model to identify each of the one or more events represented therein;
for each of the identified events, searching data flow definitions associated with the data model to identify each interaction of the identified event, each interaction comprising a link by a respective data flow originating from the identified event, through any one of the intermediate objects, to a set of one or more actions;
automatically generating an event processing rule for each identified interaction of each identified event, each event processing rule defining the one or more actions as responses to the identified event;
for each of the identified events, storing each automatically-generated event processing rule for the identified event in an interaction set created for the identified event, the interaction set usable for subsequently processing occurrences of the identified event;
determining each selected one of the intermediate objects for which the data flow through the intermediate object originates from two or more of the events;
in response to determining the each selected one, automatically defining a context relationship therefor; and
updating a corresponding one of the automatically-generated rules in the interaction set, the corresponding one relating the two or more of the events, to include the automatically-defined context relationship.

* * * * *